(12) United States Patent
Luxem

(10) Patent No.: US 6,611,345 B1
(45) Date of Patent: Aug. 26, 2003

(54) METHOD AND DEVICE FOR DETERMINING THE POSITION OF AN OBJECT HAVING FACES AND EDGES, AND A POSITIONING SYSTEM

(75) Inventor: Wolfgang Luxem, Kiel (DE)

(73) Assignee: NexPress Solutions LLC, Rochester, NY (US)

( * ) Notice: Subject to any disclaimer, the term of this patent is extended or adjusted under 35 U.S.C. 154(b) by 78 days.

(21) Appl. No.: 09/657,897

(22) Filed: Sep. 8, 2000

(30) Foreign Application Priority Data

Sep. 18, 1999 (DE) ......................... 199 44 845

(51) Int. Cl.[7] ............................. G01B 11/14
(52) U.S. Cl. ................ 356/614; 356/615; 356/620; 356/622
(58) Field of Search ............... 356/614, 615, 356/620, 622, 601, 603, 606, 611

(56) References Cited

U.S. PATENT DOCUMENTS

| | | | | |
|---|---|---|---|---|
| 4,711,579 A | * | 12/1987 | Wilkinson | 356/615 |
| 4,991,966 A | * | 2/1991 | Raymond | 356/614 |
| 5,546,179 A | * | 8/1996 | Cheng | 356/73 |
| 5,675,407 A | * | 10/1997 | Geng | 356/121 |
| 5,960,413 A | * | 9/1999 | Amon et al. | 235/385 |
| 5,982,491 A | * | 11/1999 | Breyer et al. | 356/608 |
| 6,060,721 A | * | 5/2000 | Huang | 250/559.33 |
| 6,064,759 A | * | 5/2000 | Buckley et al. | 382/154 |

* cited by examiner

*Primary Examiner*—Frank G. Font
*Assistant Examiner*—Roy M. Punnoose
(74) *Attorney, Agent, or Firm*—Lawrence P. Kessler

(57) ABSTRACT

Determining the position of a sheet pile (1, 12) having faces (2) and edges (3) is achieved by at least one defined illumination zone (5, 5', 5") produced on the sheet pile (1, 12) by diverging beams (4), and at least two boundaries (6, 6', 6", 6''', 6'''') of at least one illumination zone (5, 5', 5") are detected and used to determine the position of the sheet pile (1, 12). A device is correspondingly configured with at least one illumination system (9, 9') and at least one receiver (7, 7'). A positioning system (10) is additionally fitted with a controller (11) in order to bring the sheet pile (1, 12) from the determined actual position (20) into its desired position (21).

8 Claims, 5 Drawing Sheets

METHOD AND DEVICE FOR DETERMINING THE POSITION OF AN OBJECT HAVING FACES AND EDGES, AND A POSITIONING SYSTEM

FIELD OF THE INVENTION

The invention relates to determining the position of an object having faces and edges, in particular a sheet pile, having at least one light-sensitive receiver and an evaluation device.

BACKGROUND OF THE INVENTION

A method, a device and a positioning system determining the position of an object having faces and edges, is shown, for example, in DE 198 16 181 A1. What is involved is the positioning of a sheet pile for feeding sheets to a sheet-fed printing press. Proposed for this purpose are spacing sensors which in each case determine at only one point the spacing of the sheet pile from a reference point. Further proposals in this publication consist in using a CCD linear array to determine the jump in intensity caused by a side edge of a pile, or detecting the contour of a side edge of a pile by a camera and using this information to position the sheet pile. A disadvantage of these proposed determinations of the position of the sheet pile is that the sensor can be used to determine no more than one spacing measure, resulting in the need to arrange a multiplicity of sensor to position the sheet pile accurately. This would require two sensors just to detect the angle of deviation of a line, for example an edge, assuming that the deviation of the actual position from the desired position occurs in a plane and not in a three-dimensional space. However, since the deviations occur in such a space, and measure and angular deviations as well as oblique or corrugated front edges, possibly even paper stacks rotated above the vertical axis can occur, it is necessary according to the known prior art either to operate with a high outlay or to dispense with detecting all possible errors. Of course, this problem is not limited to the positioning of a sheet pile, but concerns the determination of the position and thus also the positioning of all sorts of objects which have faces and edges which can be used to determine the position. Moreover, the same problem arises when determining the shape of an object, such as the height of a paper stack, or when detecting and correcting deviations such as an oblique or rotated outer surface of a pile.

It is therefore the object of the invention to simplify the determination of the position, and thus also the positioning of an object having faces and edges, in particular a sheet pile.

SUMMARY OF THE INVENTION

The object is achieved according to the invention by virtue of the fact that at least one defined illumination zone is produced on the object by diverging beams, and in that at least two boundaries of at least one illumination zone are detected and used to determine the position of the object.

Further, the object is achieved according to the invention by virtue of the fact that at least one illumination system is configured for producing at least one boundary, and in that the at least one receiver detects at least two boundaries and transmits them to the evaluation device for the purpose of determining the position of the object.

In order to configure the positioning t provides for fitting it with the abovementioned device and with a controller which uses the determined actual position of the object to cause control movements of the positioning system in order to bring the object into a desired position.

The advantage of the invention consists in that two spacings from a reference line can be detected as early as when detecting two boundaries of an illumination zone—this is the simplest configuration of the invention. If the detection of edges of the object and/or further boundaries of the illumination zone or further illumination zones on one or more faces of the object is also included, the position of an object, in particular its position in space, can be detected with relatively few receivers. It is also possible in this way to detect the shape of an object, in particular it is possible to detect oblique positions or corrugations of an outer edge of a sheet pile, or a vertical rotation of a sheet pile about an axis. Above all, it is possible to retain a relatively high number of measured values using a receiver of planar design For example, by including two edges of a face it is possible to position it completely, including its angular position in space—that is to say within an x, y and z-coordinate system. It is possible with the aid of three planar receivers to determine not only the positioning of a cuboid in space, including the angular position, but additionally also to detect irregularities in the cuboid, for example the oblique position or the rotation of a sheet pile.

In order to detect complicated objects, for example the corrugation and rotation of the face of a sheet pile, it is possible to produce a multiplicity of illumination zones on a face and to detect these with the aid of a planar receiver. Of course, it is possible to fit such receivers on a few or all sides of a body in order to be able to detect virtually any desired body having faces and edges.

A few expedient embodiments may be mentioned from the multiplicity of possibilities. In this case, the device for carrying out the method can be produced from commercially available optoelectronic components, and so the overall device can be provided cost-effectively and will function reliably and free of maintenance over a long period.

An expedient refinement of the method provides that the illumination zone extends as far as an edge of the object in order to determine the position of the edge and the position of the face adjoining this edge. It is possible in this way to determine both the position of the face relative to a reference line, and the position of the edge. However, the position of this edge also provides the position of the face adjoining the first face at this edge, and it is possible in this way to determine the spacing in two orthogonal directions. With reference to the device, at least one illumination system is directed onto the object in such a way that at least one edge of the object forms at least one boundary of at least one illumination zone. In this case, a receiver can detect, for example, the edge and the boundary of the illumination zone on the face, and it is thereby possible to measure the two above-named spacings and correct them by a position system.

A further refinement of the method provides that at least one further illumination zone produced on a face id detected in order to determine the position of the face. In this case, it is possible not only to determine the distance of the face from a reference line or from a reference surface, but also the angular position of the face with reference to the reference line or a reference surface. With reference to the device, it is then necessary to provide at least one illumination system for producing at least one further illumination zone, and to provide the receiver to detect this at least one further illumination zone. In order to determine the angular position with reference to a line, it suffices to detect boundaries of the illumination zones which are aligned in parallel. If, by contrast, the position of a face of the object is to be determined in space, it is necessary to detect at least two further boundaries which run at an angle to at least two boundaries, which are likewise detected. It is expedient to detect boundaries which are in mutually orthogonal alignment, at least one illumination system being provided with reference to the device in such a way that it produces at least one illumination zone with boundaries which run at least partially at an angle to one another, preferably being aligned in a mutually orthogonal fashion. In order to be able to detect these boundaries by a receiver, it is expediently provided that at least one receiver is in a planar fashion to detect a plurality of boundaries, lying in a face, of at least one illumination zone. It is possible in this way to detect the position of a face in space, including its angular position and also its boundaries. It is even possible to determine deviations of the face from planarity such as, for example, corrugated deformations.

By detecting further boundaries on further faces of the object, it is possible to determine its position in space. It is, moreover, possible even to detect the size and shape of the object. For this purpose, it is provided with reference to the device that at least one further illumination system and at least one further receiver are arranged for the purpose of detecting boundaries of illumination zones on further faces of the object.

Planar receivers, for example CCD arrays, detect any type of boundaries of illumination zones on a face. With reference to detecting sheet piles, this has the advantage that the course of the pile sides and front edge can be detected at least in a subregion. It is also possible to determine the upper horizontally running pile edge, and thus the pile height. It is also possible with the aid of such planar elements to measure all three coordinates, these being in the case of a sheet pile, for example, the pile height and the lateral alignment, which can be detected, for example, from the upper half of a planar element. The lower half of the planar element can then be used for the triangulation of the remaining dimensions, and can serve the purpose of bringing the front face of the pile into its desired position.

Pulsed light, expediently infrared light, is preferably used as the light. The device then provides a pulsed light source, preferably an infrared light source and corresponding receivers. The advantage of this is that a high degree of suppression of unwanted light is achieved, it thereby being possible to illustrate the jumps in intensity, which specify the boundaries of the illumination zones, with as much contrast as possible on the receiver.

The positioning system can, of course, be for positioning all types of detected objects. A significant field of application is the positioning of a paper stack for automatically feeding paper sheets to a printing machine. The positioning system is then such that the front face, a side edge and the front upper edge of the paper stack are detected and the position is corrected in such a way that these assume their desired position. A particularly advantageous development of the positioning system provides that the latter is such that, given irregularities in the front face or in a side edge of the paper stack, it undertakes continuous correction of the paper stack to achieve the desire position for the uppermost paper sheet. This is important because the uppermost paper sheets are to be fed to the printing machine by a sheet guide, and it is necessary to align these sheets exactly.

The invention, and its objects and advantages, will become more apparent in the detailed description of the preferred embodiment presented below.

BRIEF DESCRIPTION OF THE DRAWINGS

The principle of the invention and a series of expedient refinements are explained below with the aid of the drawings in which.

DETAILED DESCRIPTION OF THE INVENTION

Figure 1A:
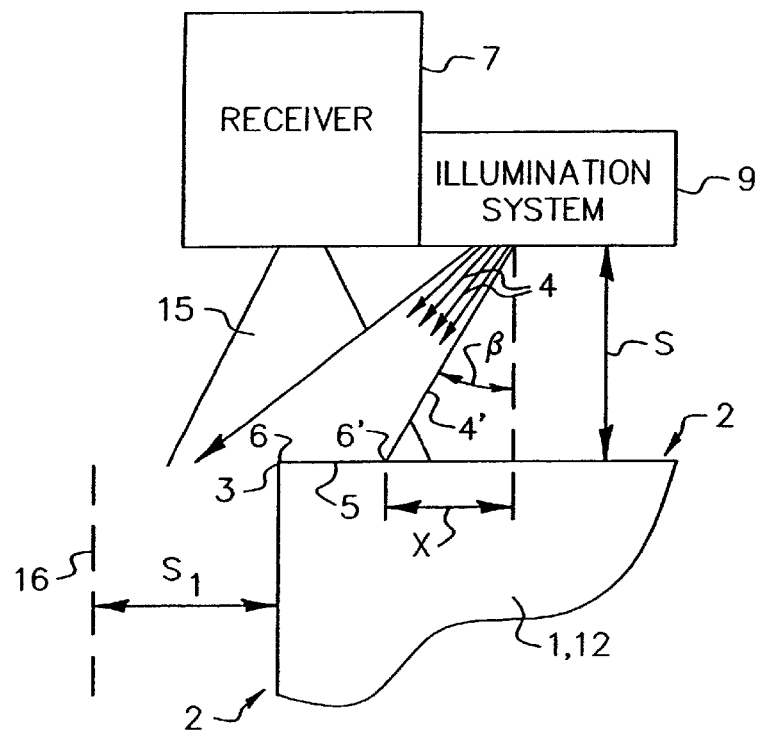
FIG. 1a shows a simple embodiment for determining spacings in two orthogonal directions.

FIG. 1a shows a simple embodiment of the invention for determining spacings s and si in two orthogonal directions. Arranged for this purpose is an illumination system 9 which directs diverging beams 4 onto the face 2 of an object 1 in such a way as to produce on the face 2 an illumination zone 5 of which one boundary 6 is the edge 3 of the object 1 and the other boundary 6' is located on the face 2. A receiver 7, having a viewing field 15, is directed toward the illumination zone 5.

Figure 1B:
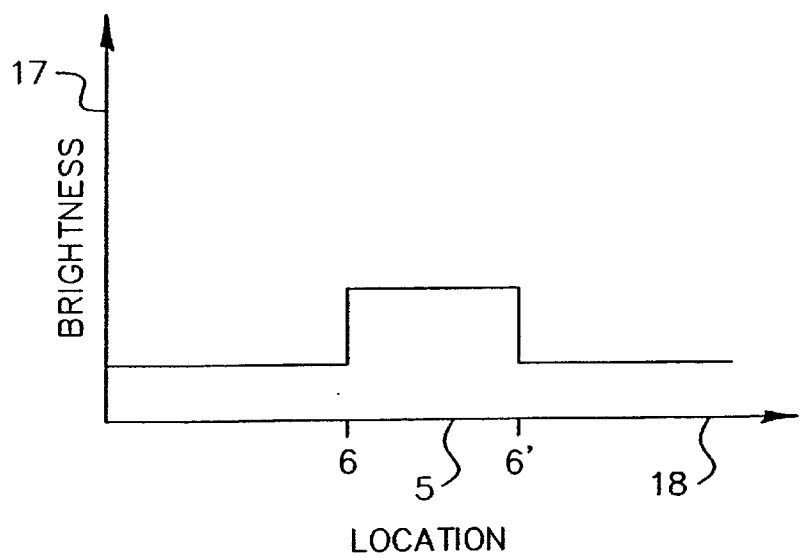
FIG. 1b shows the signals picked up by the receiver in the case of the object of FIG. 1.

FIG. 1b shows the signals picked up by the receiver 7 in the case of the object 1. In this case, the brightness 17 is plotted against the location 18. The increased brightness of the illumination zone 5 can be seen and, together with the boundaries 6 and 6', specifies the locations of the latter on the abscissa. In this way, the boundary 6 specifies the spacing si of the left-hand side 2 of the object 1 from a reference line 16. The spacing s, which can be the spacing from a further reference line or from the illumination system 9 and the receiver 7, can be determined from known and measured variables. The angle β is known in this case, it being the angle of the beam 4' which is to be ascribed to the boundary 6' of the illumination zone 5. The position of the boundary 6' yields the measure x relative to the perpendicular, which can be used to calculate the spacing s from $$\frac{x}{\tan g \beta}.$$

Figure 2A:
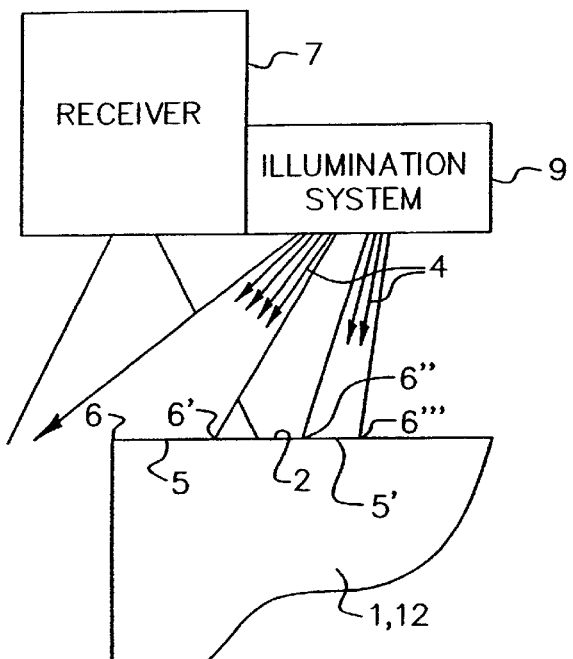
FIG. 2a shows an embodiment with the aid of which it is additionally possible to determine an angular position in two-dimensional space.
Figure 2B:
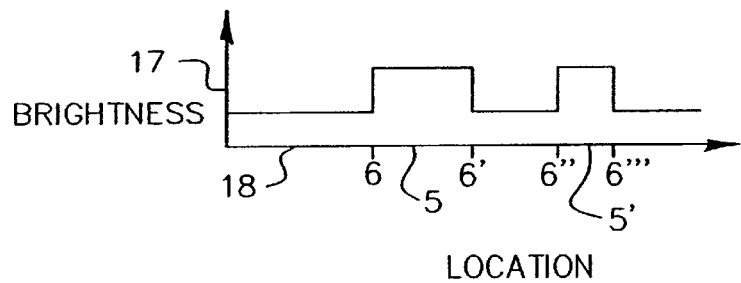
FIG. 2b shows the signals picked up by the receiver in the case of the object of FIG. 2.

FIG. 2a shows a further embodiment of the invention, with the aid of which it is additionally possible to determine an angular position of the side 2 in two-dimensional space. For this purpose, the illumination system 9 is designed in such a way that is produces a second illumination zone 5' on the surface 2 of the object 1 by further diverging beams 4. This illumination zone 5' has boundaries 6" and 6'". As in FIG. 1a, a further spacing s can be determined at another location by using one of these boundaries 6" or 6'". The basis of this determination is a signal illustrated in FIG. 2b, it being possible to use the boundary 6" or the boundary 6'" for this purpose. The angular position can be determined in two-dimensional space straightaway from two spacings at two locations of the face 2.

Figure 3:
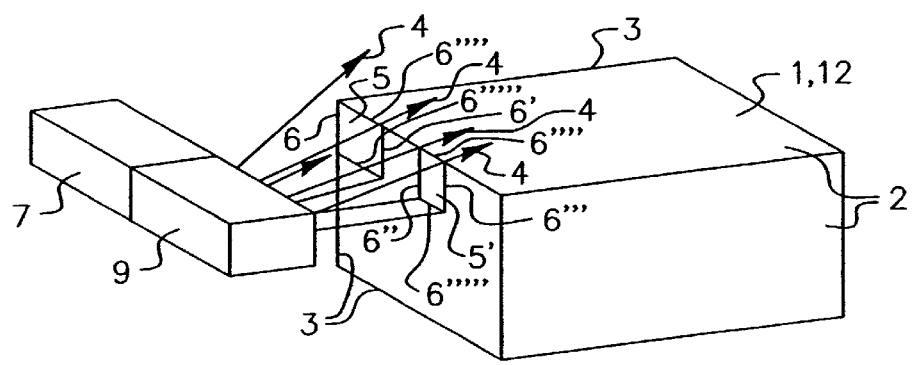
FIG. 3 shows an embodiment in the case of which it is possible to determine spacings and an angular position in three-dimensional space.

FIG. 3 shows an embodiment in which the spacings and angular position can be determined in three-dimensional space. For this purpose, the illumination system 9 is designed in such a way that it produces on the face 2 of an object 1 illumination zones 5 and 5' which in addition to the boundaries 6, 6', 6" and 6'" already mentioned with reference to FIG. 2 produce boundaries 6"" and 6'""" running orthogonal thereto. In this case, the boundaries 6"" or 6'""" can coincide with an edge 3 of the object 1, for example the upper edge 3. The receiver 7 is a flat receiver and can therefore pick up and correspondingly evaluate the illumination zones 5 and 5' with their two-dimensional boundaries 6, 6', 6", 6'", 6"", 6'""", as a result of which it is possible to determine the spacings of the object 1 in three-dimensional space, and also the angular positions in three-dimensional space in accordance with the above-named method.

Figure 4:
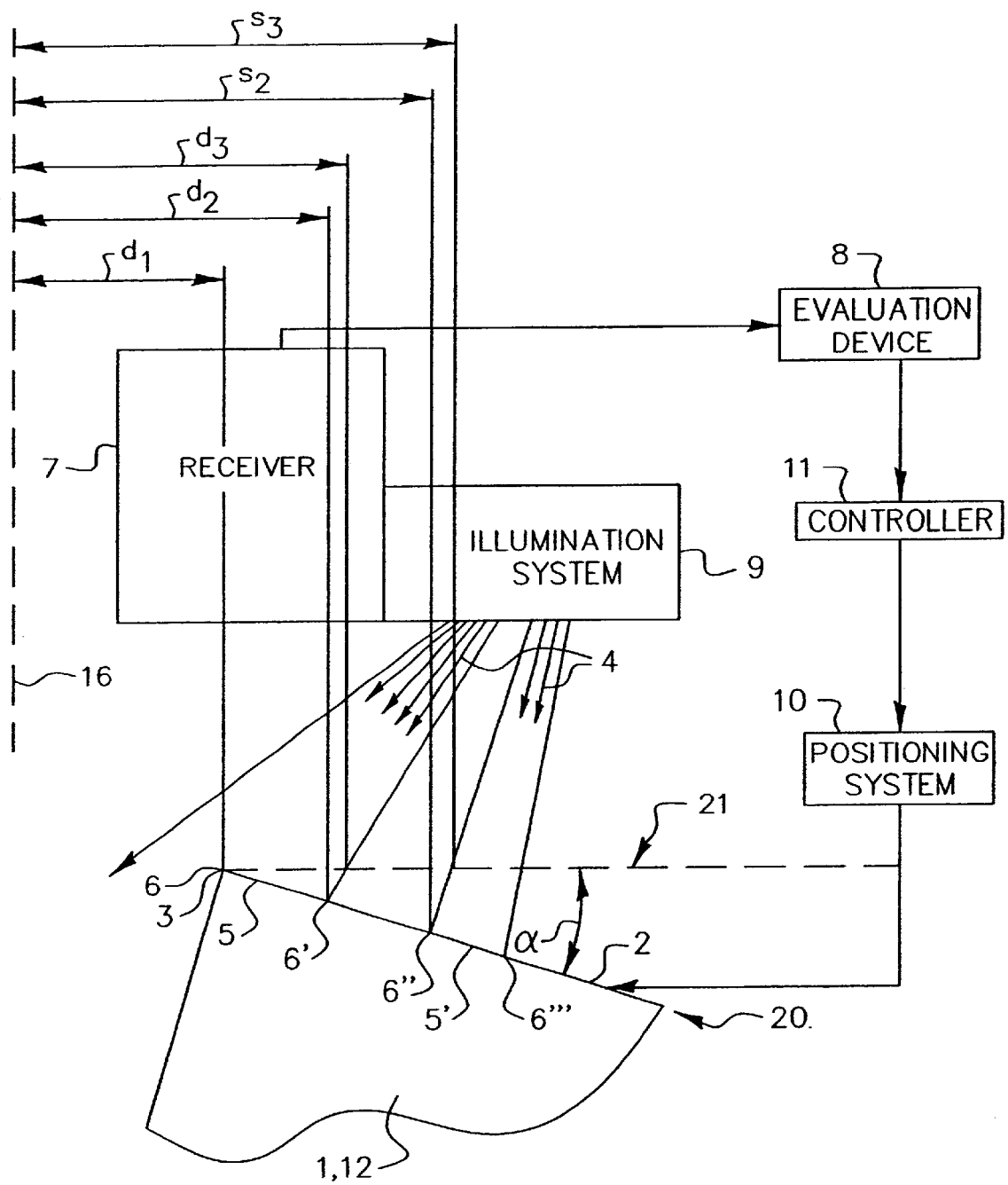
FIG. 4 shows the detection and correction of an angular position in two-dimensional space.

FIG. 4 shows the detection and correction of an angular position in two-dimensional space. The embodiment corresponds to FIG. 2a mentioned above. The receiver 7 measures the spacing $d_1$ of the boundary 6 and the illumination zone 5 from the reference line 16. This spacing $d_1$ is identical to the spacing of the edge 3. Furthermore, the spacings of the boundary 6' and 6", that is to say $d_2$ and $d_3$ from the receiver 7, are measured. The measurement is transmitted to an evaluation device 8 which converts the measured values into data which specify the position of the object 1. These data are passed to a controller 11 which compares the actual position 20 with the desired position 21 and instigates an appropriate correction of the position of the object 1 by a positioning system 10. The function of the latter is symbolized here only symbolically by the arrow directed onto the object 1. In FIG. 4, only an angular rotation a of the face 2 of the object 1 relative to the desired position 21 is drawn in as control movement. Starting from the illustrated position of the object 1, this rotation by the angle α is performed until the measured spacings $d_1$ and $d_2$ of the boundaries 6 and 6' from the reference line 16 correspond to the spacings in the desired position 21. The spacing of the boundary 6' from the boundary line 16 is the spacing $s_2$ in the desired position 21, and the spacing of the boundary 6" from the reference line 16 is the spacing $S_3$ in the desired position 21.

The rotation of the object 1 by the angle a is, of course, shown only by the example, it also being possible, in addition, to correct the spacings $s_1$ and s already illustrated in FIG. 1a, or other spacings and angular positions. The latter is performed correspondingly in the case of an object as was illustrated in FIG. 3.

Figure 5:
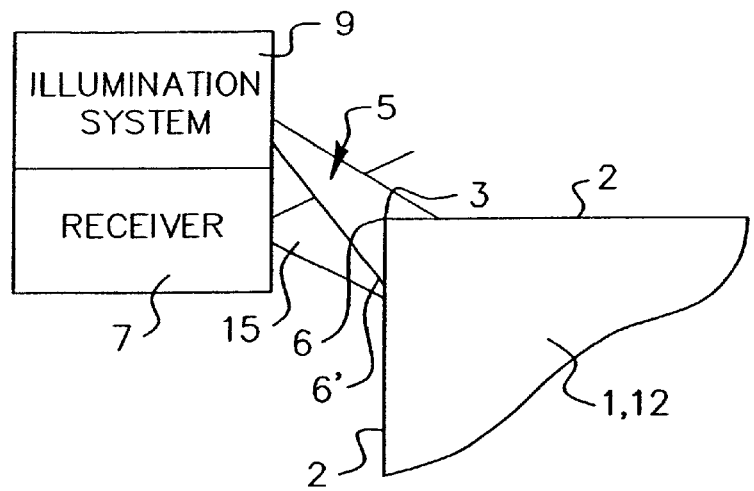
FIG. 5 shows an embodiment in accordance with FIG. 1, having a lateral arrangement of an illuminating system and receiver.

FIG. 5 shows an embodiment in accordance with FIG. 1a with a lateral arrangement of the illumination system 9 providing a diverged light beam and receiver 7 having a viewing field 15. When the object 1 is a sheet pile 12, the position of the edge 3, and thus of the front face 2, of the sheet pile 12, are determined in this way. Moreover, the position of the left-hand pile side 2 is determined as second measure. Of course, the illumination system 9 and receiver 7 can be arranged on any desired sides of an object 1. The arrangement of a plurality of pairs of illumination systems 9 and receivers 7 is also possible.

Figure 6:
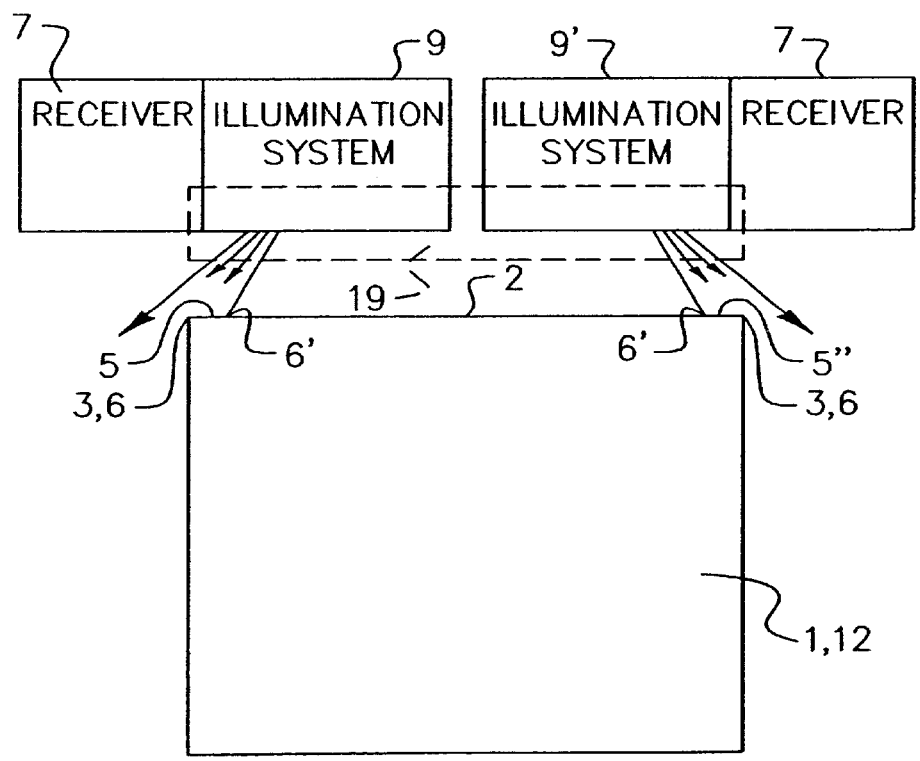
FIG. 6 shows an embodiment with two pairs of illumination system and receiver.

Thus, FIG. 6 shows an embodiment with two pairs of illumination system and receiver 7 and 9 as well as 7' and 9'. In this way, two illumination zones 5 and 5" are produced, their boundaries 6 respectively specifying the position of one of the two front edges 3 of the object 1. Such a system can also be used to determine the angular position of the face 2, for example of a sheet pile 12. A corresponding positional correction can then be used, for example, to feed the sheets 13 exactly to a paper stop 19, in order then to be able to process them further. Such a pair of illumination system and receiver 9 and 7 as well as 9' and 7' can, however, also be used to detect the width of an object 1. Alternatively, it would also be possible, of course, to produce the illumination zones 5 and 5" by a single illumination system 9 and detect them using a single receiver 7 of two-dimensional configuration.

Figure 7:
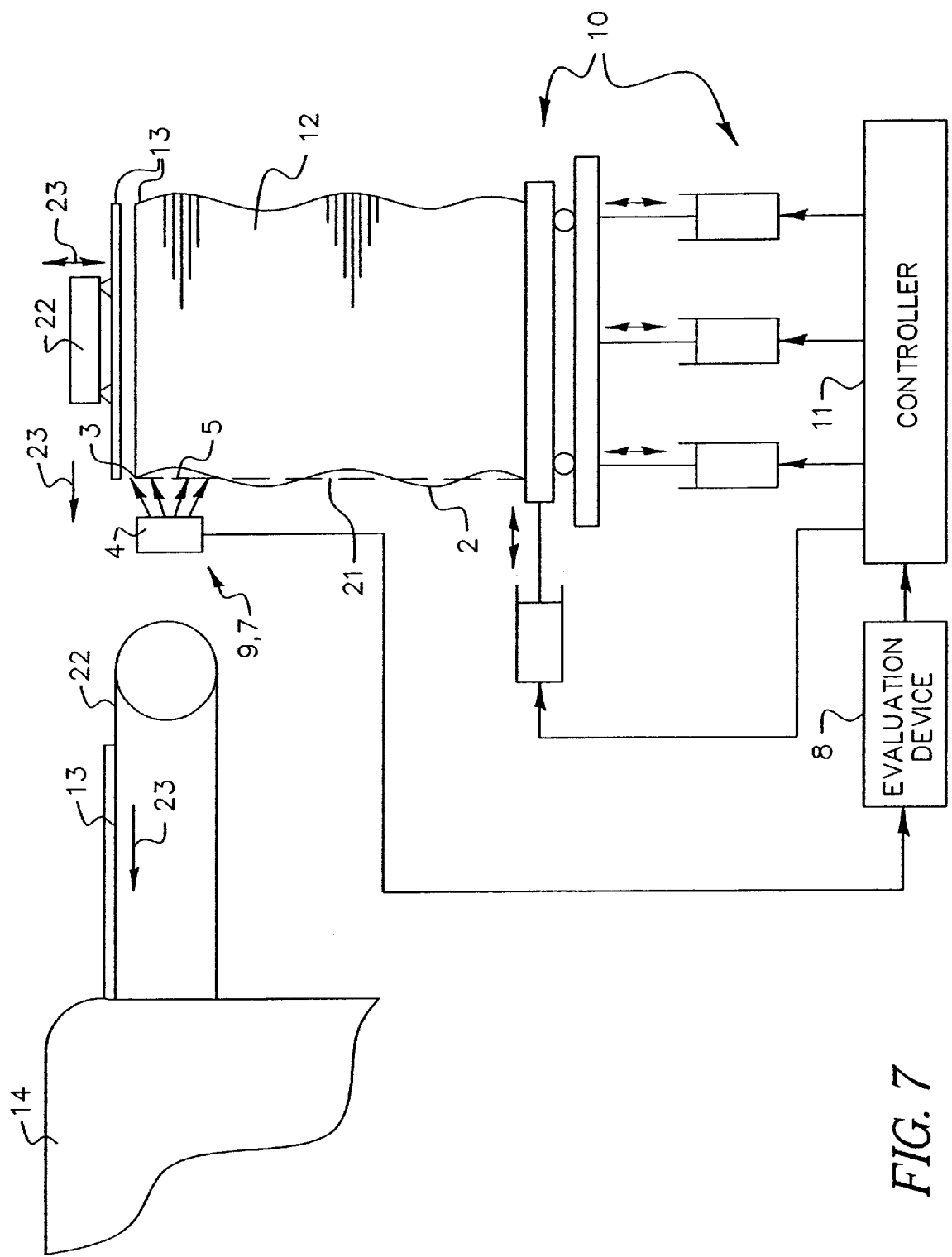
FIG. 7 shows a positioning system.

FIG. 7 shows a positioning system 10 which is combined with the inventive determination of the position of an object 1, 12. Here, the object 1 is a sheet pile 12, for example a paper stack, for feeding the paper sheets 13 to a printing machine 14 via a feed guide 22, the arrows 23 showing the feeding of the paper sheets 13. In order to achieve exact feeding, it is necessary for the uppermost sheet 13 to assume an exact position. Arranged for this purpose on the front side 2 of the sheet pile 12 are at least one illumination system 9 and a receiver 7 which determine the position of the sheet pile 12 and, in particular, the position of the front face 2. Because the paper sheets 13 lie on one another inexactly, irregularities of the side face 2 can occur with such sheet piles 12. This face can be, for example, a face 2 of corrugated shape, as illustrated in the figure. In such a case, the actual position 20 of the upper edge 3 of the sheet pile 12 must always be determined so that the sheet 13 taken off by the sheet guide 22 can be fed to the printing machine 14 in an exact position. For this purpose, the at least one illumination system 9 and the at least one receiver 7 are configured in such a way that they can determine the irregularities in the front face 2. These data are passed to an evaluation device 8 which feeds them to a controller 11. A positioning system 10 for the sheet pile 12 is provided by the controller 11 with control commands in such a way that the sheet pile 12 is corrected in such a way that the uppermost paper sheet 13 is located in its exact position. For this purpose, the positioning system 10 is such that it can be used to approach any measure and any angular position in space by virtue of the fact that, for example, the control elements illustrated in the face are also arranged spatially in a corresponding way.

Since the invention permits a large number of refinements, the illustrations and associated descriptions are merely examples of possible embodiments. In particular, it is also possible to detect other objects which do not necessarily have a cuboid shape. The invention can also be applied when providing or packing objects, in manufacture or in assembly, and be designed for the objects respectively to be handled and for the positionings respectively required.

The invention has been described in detail with particular reference to certain preferred embodiment thereof, but it will be understood that variations and modifications can be effected within the spirit and scope of the invention.

Parts List

1 Object
2 Faces of the object
3 Edges of the object
4 Diverging beams
47 Beam to be assigned to the boundary 6'

5, 5', 5" Illumination zone
6, 6', 6''', 6''''
6'''', 6''''' Boundaries of an illumination zone
7, 7' Receivers
8 Evaluation device
9, 9' Illumination system
10 Positioning system
11 Controller
12 Sheet pile (paper stack)
13 Paper sheet
14 Printing machine
15 Region detected by receiver (viewing field)
16 Reference line
17 Brightness
18 Location
19 Paper stop
20 Actual position
21 Desired position of the face of the object
22 Sheet feed
23 Arrows: Feeding of the paper sheets to the printing machine
α Angle of rotation for bringing the face 2 into its desired position 21
β Angle of the beam 4'
s Spacing of the front face from a reference line (here, the distance to the receiver and illumination)
$s_1$ Spacing of the side edge from the reference line 16 (desired position)
$s_2$ Spacing of the boundary 6' from the reference line 16 when the face 2 is located in its desired position 21
$s_3$ Spacing of the boundary 6" from the reference line 16 when the face 2 is located in its desired position 21
$d_1$ Spacing of the boundary 6 of the illumination zone 5 (=edge 3) from the reference line 16 (actual position)
$d_2$ Spacing of the boundary 6' of the illumination zone 5 from the reference line 16 (actual position)
$d_3$ Spacing of the boundary 6" of the illumination zone 5 from the reference line 16 (actual position)

I claim:

1. Device for determining the position of a sheet pile (1, 12) having faces (2) and edges (3), said device comprising: at least one light-sensitive receiver (7, 7',) an evaluation device (8) associated with said at least one light sensitive receiver, at least one illumination system (9, 9') producing at least one defined illumination zone (5, 5', 5") with at least one boundary (6, 6', 6", 6''', 6'''', 6'''''), said illumination zone directed onto the sheet pile (1, 12) in such as way that at least one edge (3) of the sheet pile (1, 12) forms at least one boundary (6) of at least one illumination zone (5, 5") and in that t said at least one receiver (7, 7') detects at least two boundaries (6, 6', 6", 6''', 6'''', 6''''') and transmits them to evaluation device (8) for determining the position of the sheet pile (1, 12), and a positioning system (10) for positioning a sheet pile (1, 12), said positioning system including a controller (11) responsive to the determined actual position (20) of the sheet pile (1, 12) by said evaluation device to control movement of said positioning system in order to bring the sheet pile (1, 12) into its desired position (21).

2. Device according to claim 1, wherein said at least one receiver (7, 7') is of planar design for the purpose of detecting a plurality of boundaries (6, 6', 6", 6''', 6'''', 6'''''), lying in a face (3) of at least one illumination zone (5, 5', 5").

3. Device according to claim 1, wherein said at least one illumination system (9') and at least one further receiver (7') for detecting boundaries (6, 6', 6", 6''', 6'''', 6''''') of illumination zones (5, 5', 5") are arranged on further faces (2) of the sheet pile (1, 12).

4. Device according to claim 1, wherein said at least one illumination system (9, 9') is a pulsed light source, and in that a corresponding receiver (7, 7') is provided.

5. Device according to claim 1, wherein said at least one illumination system (9, 9') is an infrared light source, and in that a corresponding receiver (7, 7') is provided.

6. Device according to claim 1, wherein said positioning system is for positioning a paper stack (12) for automatically feeding paper sheets (13) to a printing machine (14).

7. Device according to claim 6, wherein said positioning system is for positioning the front face (2), a side edge, (3) and the front upper edge (3) of sheet pile (12).

8. Device according to claim 6, wherein said positioning system is such that, given irregularities in the front face (2) or in a side edge (3) of the sheet pile (12), it undertakes continuous correction of the sheet pile desired position (21) for the uppermost sheet pile (12).

* * * * *